United States Patent
Mages

(10) Patent No.: US 7,123,883 B2
(45) Date of Patent: Oct. 17, 2006

(54) SYSTEMS AND METHODS THAT EMPLOY A BALANCED DUPLEXER

(75) Inventor: Phil Mages, San Diego, CA (US)

(73) Assignee: Nokia Corporation, Espoo (FI)

( * ) Notice: Subject to any disclaimer, the term of this patent is extended or adjusted under 35 U.S.C. 154(b) by 21 days.

(21) Appl. No.: 10/672,128

(22) Filed: Sep. 26, 2003

(65) Prior Publication Data

US 2005/0070232 A1 Mar. 31, 2005

(51) Int. Cl.
H04B 1/44 (2006.01)
H04B 1/46 (2006.01)

(52) U.S. Cl. ............ 455/78; 455/80; 455/81; 455/326; 455/126; 455/217

(58) Field of Classification Search .......... 455/80, 455/78, 81, 326, 126, 217
See application file for complete search history.

(56) References Cited

U.S. PATENT DOCUMENTS

| | | | | |
|---|---|---|---|---|
| 3,058,070 A * | 10/1962 | Reingold et al. | ........... | 333/109 |
| 4,361,819 A * | 11/1982 | Sillard et al. | ........... | 455/217 |
| 4,490,684 A * | 12/1984 | Epsom et al. | ........... | 330/149 |
| 5,910,756 A | 6/1999 | Ella | ........... | 333/133 |
| 5,963,854 A | 10/1999 | Andreasson et al. | ........... | 455/82 |
| 5,982,825 A * | 11/1999 | Tsujimoto | ........... | 455/101 |
| 6,005,454 A | 12/1999 | Kim | ........... | 333/136 |
| 6,185,434 B1 * | 2/2001 | Hagstrom et al. | ........... | 455/168.1 |
| 6,272,329 B1 * | 8/2001 | Sawchuk | ........... | 455/326 |
| 6,407,649 B1 | 6/2002 | Tikka et al. | ........... | 333/133 |
| 6,489,860 B1 | 12/2002 | Ohasi | ........... | 333/133 |
| 6,549,090 B1 * | 4/2003 | Crescenzi, Jr. | ........... | 333/117 |
| 6,670,866 B1 | 12/2003 | Ella et al. | ........... | 333/133 |
| 6,710,650 B1 * | 3/2004 | Beaudin et al. | ........... | 455/126 |
| 6,738,611 B1 * | 5/2004 | Politi | ........... | 455/326 |
| 6,747,527 B1 * | 6/2004 | Nakamura et al. | ........... | 333/126 |
| 6,900,577 B1 | 5/2005 | Takamine | ........... | 310/313 D |

FOREIGN PATENT DOCUMENTS

EP 0422637 A2 4/1991
EP 1249934 A2 10/2002

* cited by examiner

*Primary Examiner*—Nay Maung
*Assistant Examiner*—Wen Huang
(74) *Attorney, Agent, or Firm*—Harrington & Smith, LLP

(57) ABSTRACT

The present invention relates to systems and methods that employ a novel balanced duplexer that can be utilized to facilitate concurrent signal transmission and reception. The systems and methods can be employed within mobile devices such as cell phones and utilize two-filters (e.g., acoustic) with substantially similar input/output impedances interfaced with two couplers (e.g., 3 dB hybrid), which provide isolation and maintain the duplexer's input/output impedance. The couplers interface the filters to front/back ends such as signal processors, transmitters and receivers. The novel aspects of the present invention mitigate the need to employ external directional couplers between the duplexer and front/back ends. In addition, the two-filter topology enables employment of lower powered rated filters. The systems and methods further provide for separation and isolation of transmitters and receivers, which reduces noise coupling and enables the transmitter and receiver to be placed within close proximity.

13 Claims, 11 Drawing Sheets

SYSTEMS AND METHODS THAT EMPLOY A BALANCED DUPLEXER

TECHNICAL FIELD

The present invention generally relates to signal processing, and more particularly, to a duplexer that employs a balanced filter topology for a transmitter and/or a receiver filter.

BACKGROUND OF THE INVENTION

In its infancy, mobile communication was based on an analog radio transmission referred to as Advanced Mobile Phone System (AMPS). AMPS provided adequate transmission for an emerging mobile communications consumer market; however, within a few years the emerging market grew to millions of subscribers that demanded more and more airtime, which pushed analog technology to the limit. As a result, dropped calls and busy signals became common, which fueled research and development for an improved mobile communications network.

In response, industry developed digital wireless technologies that could accommodate increased network traffic within a limited amount of radio spectrum. One such technology is Global System for Mobile (GSM), which employs Time Division Multiple Access (TDMA). TDMA comprises a time-sharing protocol that provides three to four times more capacity than AMPS. In general, TDMA employs a technique wherein a communication channel is divided into sequential time slices. A respective user of a channel is provided with a time slice for transmitting and receiving information in a round-robin manner. For example, at any given time "t," a user is provided access to the channel for a short burst. Then, access switches to another user who is provided with a short burst of time for transmitting and receiving information. This cycle continues, and eventually each user is provided with multiple transmission and reception bursts.

Shortly after TDMA was introduced, Code Division Multiple Access (CDMA) was developed and represented an enhanced solution to analog transmission. Code Division Multiple Access provides "true" sharing, wherein one or more users can concurrently transmit and receive via employing spread spectrum digital modulation, wherein a user's stream of bits is encoded and spread across a very wide channel in a pseudo-random fashion. The receiver is designed to recognize and undo the randomization in order to collect the bits for a particular user in a coherent manner. Code Division Multiple Access provides approximately ten times the capacity of analog technologies and enables increased voice quality, broader coverage and increased security. Today, CDMA is the prevalent technology employed in mobile systems.

Technological advances paved the way for the mobile communications industry to improve GSM and CDMA technologies and develop new technologies. One such improvement includes EDGE (Enhanced Data-Rates for GSM Revolution) technology. The evolution of GSM to EDGE mitigates various issues associated with voice traffic bandwidth and provides higher data throughput, which increases efficiency and higher performance. For example, EDGE provides for data rates up to 384 Kbps (with a bit-rate up to 69.2 Kbps per timeslot) over broadband. In addition, EDGE provides for more robust services such as Short Message Service (SMS) and Multimedia Message Service (MMS) for messaging, XHTML (including WAP) browsing, Java applications, FM radio reception, video streaming, and voice and image recording technologies.

Recently, the International Telecommunications Union adopted an industry standard for third-generation (3G) wireless systems that can provide high-speed data rates (e.g., for data transmission and Internet use) and new features. Currently, three operating modes—CDMA2000, WCDMA and TD-SCDMA—based on CDMA are being developed. CDMA2000 technology provides a relatively simple, quick, and cost-effective path to 3G service. CDMA2000 1x technology supports voice and data services over a standard CDMA channel. Additionally, it provides up to twice the capacity (e.g., peak data rates up to 153 kbps and projected peak data rates up to 307 kbps, without compromising voice capacity) of early CDMA networks. The additional capacity accommodates growth in the Internet market. Moreover, CDMA2000 1x provides longer standby times and is backwards compatible. CDMA2000 1x EV-DO technology provides a data optimized version of CDMA2000 with peak data rates over 2 Mbps and an average throughput of over 700 kbps, which is comparable to DSL and can support video streaming and large file downloads. WCDMA and TD-SCDMA provide more complex enhancements.

As mobile communication transmission evolves, the electrical and software industries are concurrently developing mobile devices that are smaller, consume less power, cost less and include more applications. One obstacle confronted by mobile device designers is the need to provide isolators between filtering components and front/back ends. Such isolators can consume valuable space within already densely populated circuitry and increase design complexity.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate concurrent transmission and reception of signals via a balanced duplexer. In general, the systems and methods employ a two-filter duplexer, wherein the filters (e.g., acoustic wave) provide substantially similar input and output impedances (e.g., balanced filter topology). The filters are interfaced to a back-end (e.g., signal generator and processor) and a front-end (e.g., antenna and detector) via two couplers (e.g., 3 dB hybrid couplers such as the Lange coupler). Employing 3 dB hybrid couplers within the duplexer decreases reflected RF energy from the filter inputs and outputs and provides for additional band-pass filtering. Employing 3 dB hybrid couplers ( e.g., Lange couplers ) provides isolation between the front/back ends and the filters, thus mitigating the need to utilize isolators between such components and facilitating footprint reduction.

Both filters can be employed during the transmission of a signal. Utilizing a balanced filter topology in connection with a suitable power ratio, signal power can be split such that about one half of the power traverse one filter while the remaining power traverses the other filter. Thus, the filters employed can be rated at one half full power. As a result, the combination of the two couplers and two filters can be comparable in size to a single full power filter employed in conventional systems. In addition, if one of the filters should become inoperable, the other filter can process the full power for virtually uninterrupted performance. During reception, one filter is typically employed, although the balanced topology can be utilized to improve antenna-to-filter and filter-to-LNA matching. In addition, the novel aspects of the present invention provide for separation and isolation of the transmitting and receiving components which enables the components to be positioned in close proximity within the device while reducing noise associated with power coupling.

The couplers provide stable duplexer input and output impedances, which mitigates constraints on filter impedances. The couplers utilize terminating resistors to divert power reflection to maintain the duplexer impedances. Furthermore, the couplers can accommodate any known filters such as the SAW, FBAR, BAW and SMR filters to be integrated within the duplexer.

In one aspect of the present invention, systems are provided that facilitate transmitting and/or receiving information. The systems can be utilized in connection with mobile and stationary communication systems such as mobile phones, web phones, personal data assistants (PDAs), hand-held PCs, pocket PCs, palm-pilots, laptops, tablet PCs, Notepads, GPS devices, pagers, personal computers, mainframes, workstations and other microprocessor-based devices. In general, the systems employ a duplexer that provides for concurrent transmission and reception of signals within a frequency band, for example, the cellular and PCS frequency bands. The duplexer can be constructed as a balanced duplexer, wherein at least one and preferably two filters are employed in connection with the transmission and reception of signals. Utilizing two filters provides for selecting filters rated about one half the total power rating. Transmission and reception is isolated, which reduces noise coupling and allows the transmission and receiving components to be positioned closer together.

In another aspect of the present invention, methodologies are provided for transmitting and receiving signals with devices that utilize the novel aspects of the present invention and constructing systems that employ the novel aspects of the present invention. The transmitting methodology comprises generating a signal, processing the signal for transmission, conveying the signal to a two-filter balanced duplexer wherein the signal is split (e.g., via a four channel Lange coupler or discrete component coupler), filtered (e.g. via acoustic wave filters), re-combined (e.g., via the Lange coupler or discrete component coupler) and then conveyed to an output port for transmission (e.g., via an antenna). The receiving methodology comprises the foregoing transmitting system, wherein a signal is received at a port (e.g., antenna and detector), conveyed through at least one filter of the balanced duplexer, and then provided to the device for further processing (e.g., displaying text and images and providing voice).

To the accomplishment of the foregoing and related ends, certain illustrative aspects of the invention are described herein in connection with the following description and the annexed drawings. These aspects are indicative, however, of but a few of the various ways in which the principles of the invention may be employed, and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
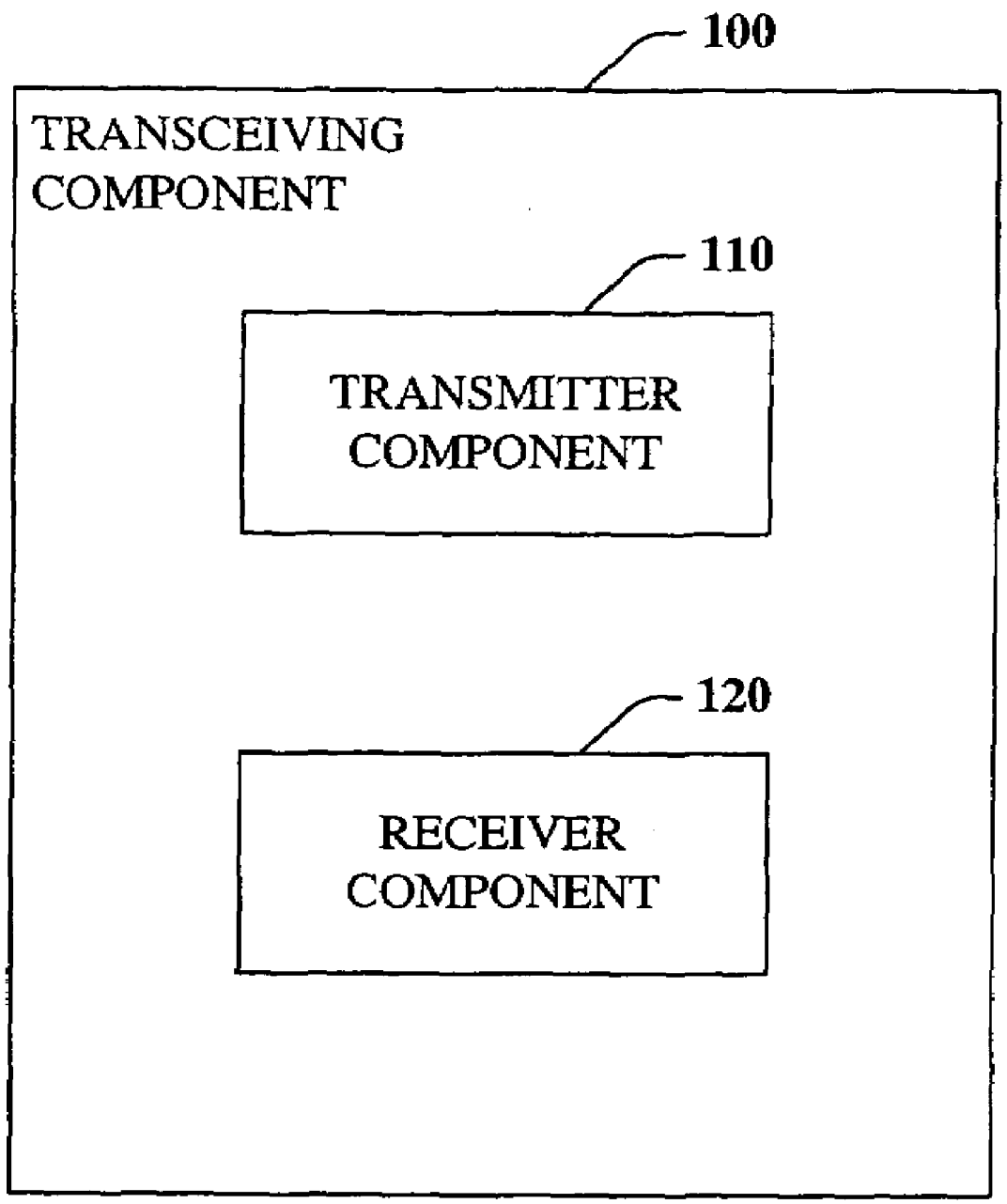
FIG. 1 illustrates an exemplary transmitting and/or receiving component, in accordance with an aspect of the present invention.

The present invention relates to systems and methods for a communication system's transceiving component that can facilitate concurrent transmission and reception of signals within the system. The systems and methods utilize a balanced two-filter duplexer, wherein both filters can be utilized during signal transmission and reception. The filters are selected such that the input and output impedances are substantially similar, and a coupler (e.g., Lange, discrete and any 3 dB hybrid coupler) is utilized to provide isolation between the duplexer's front/back ends and to set and maintain the duplexer's input and output impedance. Employing such couplers mitigates the need to utilize isolators. The foregoing configuration provides for separation and isolation of transmission and reception, which reduces noise coupling and provides for a design wherein the transmitter and receiver can reside within close proximity. In addition, signal power can be split over the two filters during transmission, which enables lower power rated filters to be selected.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates an exemplary transceiving component 100 that can be employed to facilitate transmitting and/or receiving information between systems, in accordance with an aspect of the present invention. The transceiving component 100 can be utilized in connection with mobile (ambulatory and portable) and stationary communication systems. Examples of suitable mobile systems include, but are not limited to, mobile phones (e.g., cellular and PCS), web phones, personal data assistants (PDAs), hand-held PCs, pocket PCs, palm-pilots, laptops, tablet PCs, Notepads, GPS devices and pagers. Examples of stationary systems include conventional personal computer (e.g., desktop, mini-tower and tower), mainframes, workstations and other microprocessor-based devices. In order to be utilized with the foregoing mobile and stationary systems, it is to be appreciated that the transceiving component 100 can be implemented in hardware, software and/or firmware.

The transceiving component 100 can provide isolation (e.g., via coupling components) between itself and other components. For example, the transceiving component 100 can be interfaced with a back-end (not shown) without having to employ an isolator between the transceiving component 100 and the back-end (e.g., signal processor). Likewise, the transceiving component 100 can be interfaced with a front-end (not shown) without having to employ an isolator between the transceiving component 100 and the front-end (e.g., antenna, detector, etc.). Conventional systems typically employ isolating components between the back and front ends. Thus, the present invention mitigates the need for utilizing isolators when integrating the transceiving component 100 into communication systems, which can reduce cost and size and simplify the design. Such reductions can be exploited and are advantageous since the technology market demands smaller footprints and lower prices with every new generation.

In addition, the transceiving component 100 can provide stable and substantially similar input and output impedances (e.g., typically 50Ω), which facilitates achieving maximum power transfer via matching back and front end impedances with input and output impedances, respectively. Power reflections can be transferred to suitable terminations to maintain the input and output impedances.

The transceiving component 100 comprises a transmitter component 110 that facilitates sending information and a receiver component 120 that facilitates accepting information. The novel aspects of the transceiving component 100 provide for separation of and isolation between the transmitter component 110 and the receiver component 120, which can reduce noise in either or both components caused by power coupling. The separation and isolation can be advantages when employing the transceiving component 100 on a printed circuit board (PCB) since it allows the transmitter component 110 and receiver component 120 to be positioned proximate to each other, and hence reside within a reduced footprint since no isolator is required, while mitigating noise due to power coupling.

The transceiving component 100 can employ a means that defines frequency bands in which signals can be transmitted and/or received. In general, transmitted signals leave the transceiving component 100 through the transmitter component 110. In one aspect of the present invention, the transmitter component 110 can be utilized as an antenna wherein the signal is transmitted from the transmitter component 110. In other aspects of the invention, the transmitter component 100 provides a channel to convey the signal to an antenna or signal-processing component. Received signals are conveyed to the transceiving component 110 through the receiver component 120. The receiver component 120 can be an antenna or detector employed to receive the signal or the signal can be conveyed through the receiver component 120 after being received via an antenna or detector.

As noted above, the transceiving component 100 can be implemented in software, hardware and/or firmware. For example, transceiving component 100 can be a process running on a processor, a processor, an object, an executable instruction, a thread of execution, and/or a program. In another example, off-the-shelf and/or proprietary hardware, such as signal processors (e.g., DSPs), filters, couplers (e.g., splitter and combiners), and Application Specific Integrated Chips (ASICs) can be employed in connection with the transceiving component 100. Firmware can be utilized to provide low-level executable instructions, parameters and/or control code, and provide a flexible means to upgrade and/or revise hardware functionality and performance. Moreover, transceiving component 100 can be localized within an individual device and/or distributed across two or more devices.

It is to be appreciated that the transceiving component 100 can be implemented within a PCB (or Printed Wire Board (PWB)) such as a daughter board connected to a motherboard or integrated within the motherboard. A typical PCB that can be utilized in accordance with an aspect of the present invention comprises a non-conducting substrate (e.g., fiberglass with epoxy resin or ceramic substrate) upon which conductive patterns can be formed. Conductive patterns usually are constructed with copper; however, other conductive material such as nickel, silver, tin, tin-lead, gold and the like can be utilized. For example, a conductive material can be concurrently employed as etch-resists and/or top-level metal (e.g., "tinning" the surface with solder). In addition, conductive patterns can be formed within multiple layers, wherein the layers are connected by vias. Moreover, the PCB can be manufactured to be as rigid or as flexible as desired. Thus, the PCB can be designed for environments with various levels of vibration, pressure, temperature, shape, etc.

Where the transceiving component is implemented as a daughter board, the board can be mounted to the motherboard through any known means for fastening such as standoffs, connectors, expansion slots, mounting screws, sockets, right angle brackets, etc. In addition, the daughter board can be mounted directly to the motherboard or via another daughter board. Moreover, communication can be achieved between the daughter board and the motherboard via electrical, mechanical, optical, RF and/or infrared mediums.

The PCB can be single or double sided and/or multilayered and populated with passive and active circuitry via embedded, surface, ball and/or wire mount. Suitable components include filters, couplers, resisters, capacitors (e.g., bypass and coupling), inductors, various solid state devices including transistors and operational amplifiers, digital signal processors (DSPs), integrated circuits (ICs), multi-layered components such as ASICs with analog, digital and/or RF layers, multichip modules (MCMs), plastic encapsulated chips (PEMs) and microwave monolithic integrated circuits (MMICs)

Integrated chips and derivatives thereof can be surface mount and based on unpackaged ("bare") and/or flip chip technology. As known, unpackaged chips utilize bare chip dies attached to an unprocessed support substrate, wherein fabrication can occur on top of the die, resulting in modules with the ICs buried beneath the interconnect and associated ground and power planes and with no bond wires. In addition, bare chips can be mounted on a previously patterned substrate. Flip chips generally are unpackaged chips that are mounted face down for direct contact with the substrate. Employing unpackaged and flip chips provide for reduced (e.g., thin) package profiles. Die sizes can be increased, as desired, to improve heat dissipation.

Figure 2:
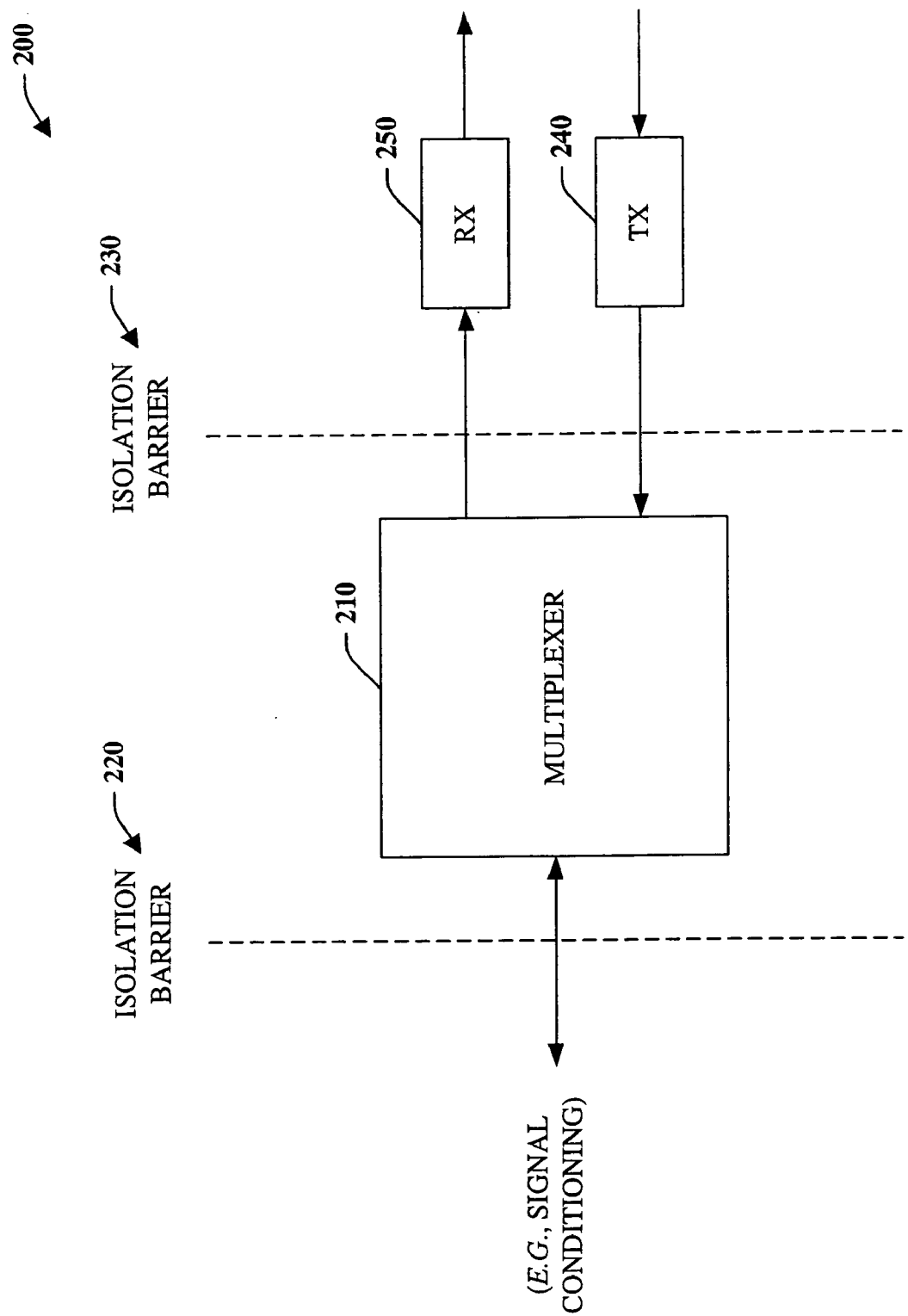
FIG. 2 illustrates an exemplary multiplexing component, in accordance with an aspect of the present invention.

FIG. 2 illustrates a system 200 that can be employed to separate transmitted and received signals, in accordance with an aspect of the present invention. The system 200 comprises a multiplexer ("MUX") 210 that can provide for serial and/or concurrent transmission and reception of a plurality of signals. In order to multiplex, MUX 210 can comprise various signal splitting and combining components and intermediate signal processing components. The splitting and combining components can include couplers such as directional (e.g., 3 dB) and hybrid couplers (e.g., 3 dB/Quadrature hybrid).

The intermediate components can include, for example, one or more filters such as low, high or band pass/reject discrete and/or acoustic wave filters, packaged in ceramic, "bare" and/or flip chips configurations. Discrete ceramic filters provide an inexpensive, high power handling and high performance approach while acoustic filters provide high performance and selectivity, and generally are more compact then their discrete sister filters.

Acoustic wave filters include surface acoustic wave (SAW) and bulk acoustic wave (BAW) filters. Both types of acoustic filters utilize the piezoelectric effect to convert electrical/mechanical energy into mechanical/electrical energy via material deformation when an RF signal is applied. In the SAW filter, energy is propagated on the surface, whereas BAW filters direct energy throughout the bulk. As briefly noted above, acoustic filters generally are compact; the SAW filter typically comprises multi-chip modules and the BAW filter can be fully integrated on a chip ("system of a chip" technology). BAW filters can be further delineated by the design approach. For example, both the Film Bulk Acoustic Resonator (FBAR) and the Soldily Mounted Resonator (SMR) can be employed as BAW filters, but they vary in design approach. The FBAR filter is designed via a membrane approach, wherein a thin $Si_xN_y$ film is applied to a substrate to construct a resonator. The SMR filter is designed via a mirror approach, wherein a stack of low and high impedance quarter-wave layers (mirrors) are employed to construct a resonator. Such filters can be employed to define frequency bands in which signals can be transmitted and/or received.

The system 200 can be employed in connection with or as part of the transceiving component 100. As such, the system 200 can provide many of the benefits described above. For example, the system 200 can provide an isolation barrier 220 with a back-end. The isolation barrier 220 mitigates the need to employ an isolating component between the back-end and MUX 210. In addition, the system 200 can provide an isolation barrier with a front-end, including a transmit port ("Tx") 240 and a receive port ("Rx") 250. Similarly, the isolation barrier 230 mitigates the need to employ an isolating component between the front-end and MUX 210. As noted previously, mitigating the need for isolating components can simplify design and reduce size and cost.

In addition, the system 200 can provide for matching MUX 210 input and output impedances, which facilitates achieving maximum power transfer between MUX 210 and the back and front ends and reduces losses due to power reflections. The means for matching the input and output impedances can additionally reduce the constraints on intermediate components utilized within MUX 210. For example, when filters are employed within MUX 210, selection of filters is not constrained within a range of input and output impedances. Furthermore, the MUX 210 can provide a buffer at the input and/or output stages.

Tx 240 can provide a pass-through for transmission or be any known device utilized for transmitting signals, such as an antenna. In addition, Tx 240 can include mechanisms to modulate, encrypt and/or encode the signal. Rx 250 can provide a pass-through for reception or be any known device utilized for transmitting signals, such as an antenna, a detector and/or a coupling device (e.g., coaxial cable, A/D converter, opto coupler, . . . ). When modulated, encrypted and/or encoded signal are received, suitable signal processing can be employed in connection with Rx 250 to demodulate, decrypt and/or decode the signals.

MUX 210 can further provide for separation of and isolation between Tx 240 and Rx 250. The separation of and isolation can reduce cross power contamination (noise) between Tx 240 and Rx 250, which can enable Tx 240 and Rx 250 to be positioned closer together, which can facilitate reducing the footprint of MUX 210.

Figure 3:
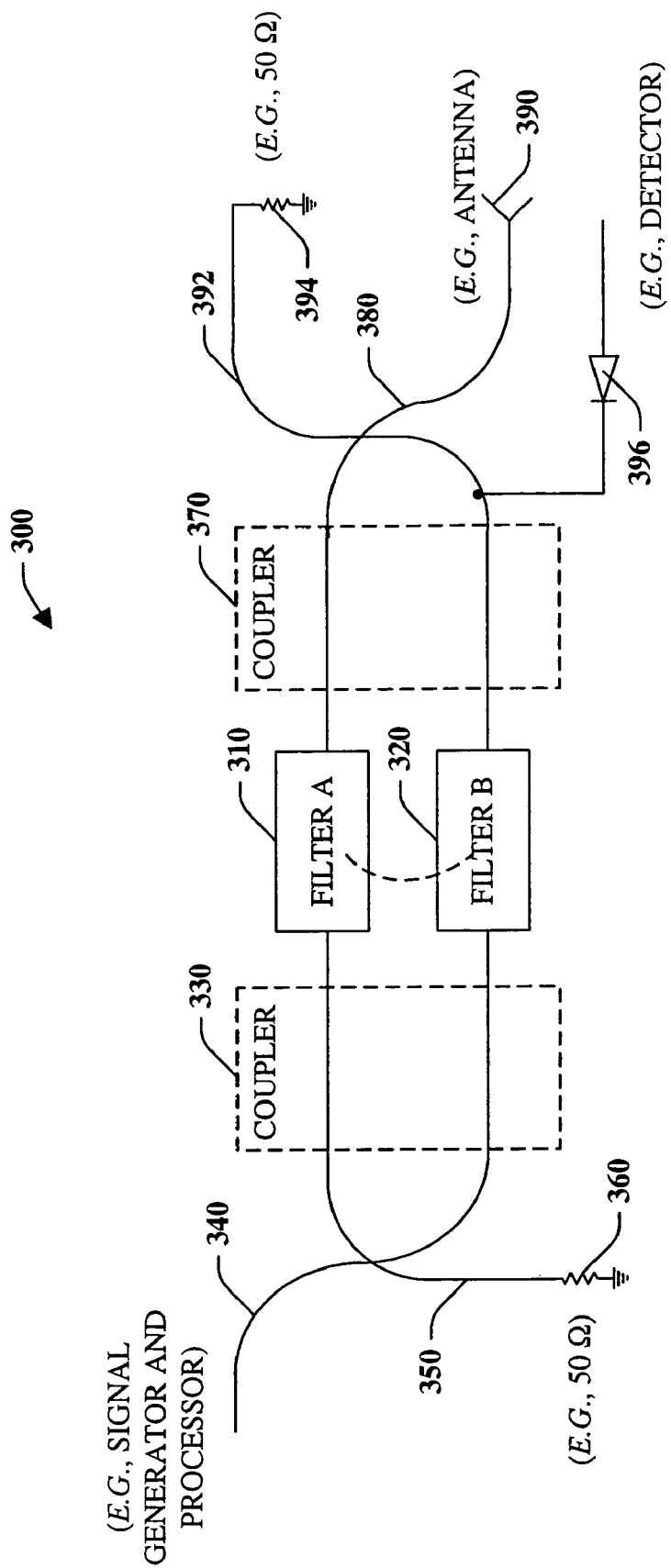
FIG. 3 illustrates an exemplary balanced duplexer, in accordance with an aspect of the present invention.

FIG. 3 illustrates an exemplary balanced duplexer 300, in accordance with an aspect of the present invention. The balanced duplexer 300 can be utilized to facilitate transmitting and receiving signals. Examples of systems that can employ the balanced duplexer 300 include the transceiving component 100 and the system 200, mobile communication systems such as cell phones, satellite communication systems, computer networks, global positioning systems, and radios.

The balanced duplexer 300 comprises a first filter ("filter A") 310 and a second filter ("filter B") 320. In general, the filters 310, 320 can be tuned to transmit and receive within desired transmit and receive frequency bands. The filters 310, 320 can be configured for the frequency bands by utilizing various low, high and band pass/reject techniques. For example, the filters 310, 320 can be designed to transmit and receive signals within the Cellular band, which typically is associated with frequencies around 850 MHz. In another example, the filters 310, 320 can be designed to transmit and receive signals within the PCS band, which typically is associated with frequencies around 1900 MHz. In yet another example, the filters 310, 320 can be designed to receive signals within the GPS band, which typically is associated with frequencies around 1600 MHz.

The filters 310, 320 can be implemented as discrete components such as resistors, capacitors, etc. and/or chips including plastic encapsulated modules (PEMs), monolithic microwave integrated chips (MMICs), and application specific integrated chips (ASICs). In one aspect of the present invention, the filters 310, 320 can be employed with variable capacitors or other elements that provide a means to calibrate and adjust the frequency band and/or vary the frequency band.

The filters 310, 320 can be any known type of filter; however, acoustic filters typically are employed. Examples of suitable acoustic filters include SAW and BAW (e.g., FBAR and SMR) filters. As known, acoustic filters employ a piezo technique, wherein electric/mechanical energy is converted to mechanical/electrical energy. For example, in the SAW filter, energy travels longitudinal to the surface of the filter and in the BAW filter, energy additionally travels into the bulk of the filter. Acoustic filters provide high performance and selectivity within a relatively small package ranging from multi-chip modules to fully integrated systems on a chip.

The balanced duplexer 300 further comprises a first coupler 330 that interfaces the filters 310, 320 with a back-end of a system. For example, the first coupler 330 can establish a path 340 from a signal-generating component (e.g., a component that generates a signal for transmission)

to at least one of the filters 310, 320 and/or from at least one of the filters 310, 320 to a signal-conditioning component. In addition, the first coupler 330 can provide an isolated path 350 to the filters 310, 320 that can be terminated to ground via an impedance-setting resistor 360. As depicted, the resistor 360 can be a 50Ω resistor, which is a standard termination impedance. However, it is to be appreciated that the any value resistance suitable for a design can be employed.

A second coupler 370 interfaces the filters 310, 320 with a front-end of a system. For example, the second coupler 370 can establish a path 380 from at least one of the filters 310, 320 to a transmitting device 390 such as an antenna and/or from the transmitting device to at least one of the filters 310, 320. Similar to the back-end, the second coupler 370 can provide an isolated path 392 from at least one of the filters 310, 320 that can be terminated to ground via an impedance-setting resistor 394. Likewise, the resistor 394 can be various valued and typically is a 50Ω resistor. The path 392 can additionally be utilized to establish a path between a detector 396 and at least one of the filters 310, 320.

The preferred couplers 330, 370 are 3 dB hybrid coupler such as a Lange or discrete coupler. However, it is to be appreciated that various other couplers (e.g., directional coupler) can be employed in accordance with an aspect of the present invention. Utilizing a Lange coupler provides the benefit of additional band-pass filtering via coupler trace shape and/or size. In addition, the Lange coupler can be implemented as conductive traces (e.g., gold, silver and copper) on a substrate, which can be employed to integrate the couplers 330, 370 with the filters 310, 320. Furthermore, the Lange coupler can mitigate employing external directional couplers and provide for detector sampling point.

In general, the Lange coupler can be implemented as a three-wire, four-port coupler. During transmission, the path 340 is utilized as an input to the first coupler 330. The first coupler 330 splits the signal power such that a portion of the signal power passes through the second filter 320 and the remaining portion of signal power is coupled to pass through the first filter 310. A coupling coefficient (e.g., a power ratio) can be utilized to determine the portion of power that passes through respective filters 310, 320. In one aspect of the present invention, a coupling coefficient is provided such that about half the power travels through respective filters 310, 320. Thus, respective filters 310, 320 can be rated at one half the total power rating, which enables a designer to utilize lower power rated components. The second coupler 370 combines the signals from the filters 310, 320 and conveys the signal to the transmitting component 390 via path 380.

As described above, transmission via the duplexer 300 utilizes both filters 310, 320. Typically, the input and output impedances of the filters 310, 320 are matched (e.g., 50Ω) to provide a balanced topology. However, it can be appreciated that in other aspects of the present invention, that only one of the filters 310, 320 is employed during transmission. The ability to employ one or both filters 310, 320 provides a mechanism wherein if one of the filters 310, 320 fails, the duplexer 300 continues to function with the other filter (e.g., with a 3 dB loss).

During reception, the coupler 370 via path 392 interfaces the receiving component 396 with the second filter 320, wherein the coupler 330 conveys the signal to the signal-conditioning component via path 340. In other aspects of the present invention, the transmitting component 390 can be employed as a receiver. As such, the path 380 can interface the received signal with the second coupler 370. Similar to the dual filter transmitter topology, a dual filter receiver can be employed, wherein the signal is split by the second coupler 370, filtered via filters 310, 320, combined by the first coupler 330, and conveyed to the signal conditioning component via path 340. Employing the dual filter receiver topology provides improved LNA and antenna matching.

The isolation paths 350, 392 provide isolation between the couplers 330, 370 and the back and front ends, respectively. Thus, employing the present invention mitigates the need to utilize an isolation component between the couplers 330, 370 and the back and front ends, which can reduce size and render a simpler design.

In addition, terminating the couplers 330, 370 with 50Ω resistors mitigates the constraint of requiring 50Ω impedance filters 310, 320. Instead, the couplers 330, 370 in connection with the balanced topology (matched input/output impedances) can maintain 50Ω input and output impedances by diverting reflected power into the 50Ω terminating resistors.

Balanced duplexer 300 can improve impedance matching by reducing reflected energy from the filters 310, 320 between the couplers 330, 370. For example, one of the filters 310, 320 can be operative to a pass-through path and the other filter can be operative to a coupled path. When the input signal is split, a portion of signal can be conveyed to the pass-through path with zero degree phase shift and the remaining portion can be conveyed to the coupled path with 90 degree phase shift. Reflected energy returns to the input with zero degrees phase shift from the pass-through path and 180 degrees phase shift (90 degrees plus an additional 90 phase shift) from the coupled path, thereby canceling each other out at the input. In addition, any residual reflected energy from the coupled path can be dissipated in the 50Ω resistor.

Figure 4:
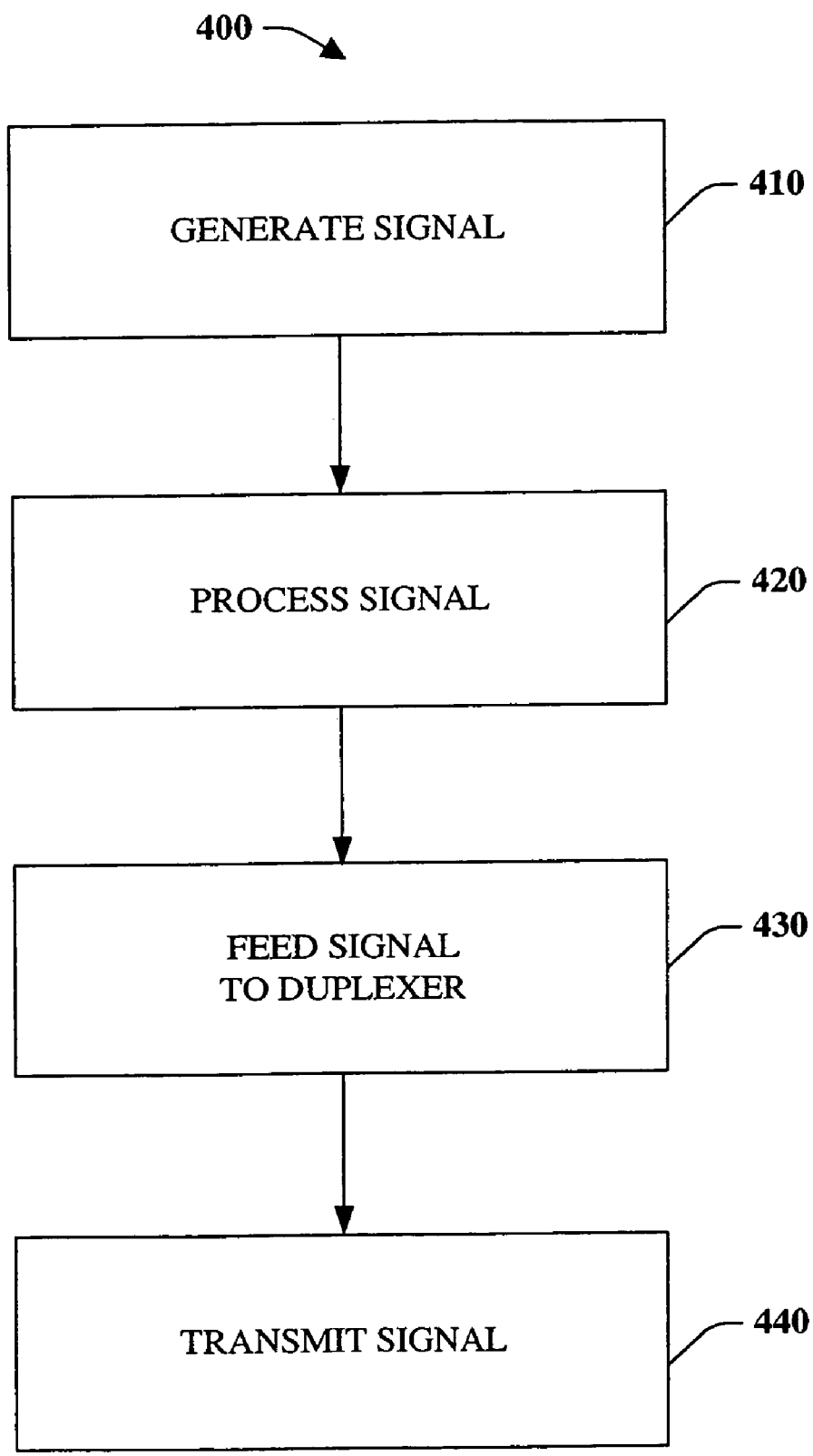
FIG. 4 illustrates a methodology to employ a balanced duplexer to transmit a signal, in accordance with an aspect of the present invention.
Figure 5:
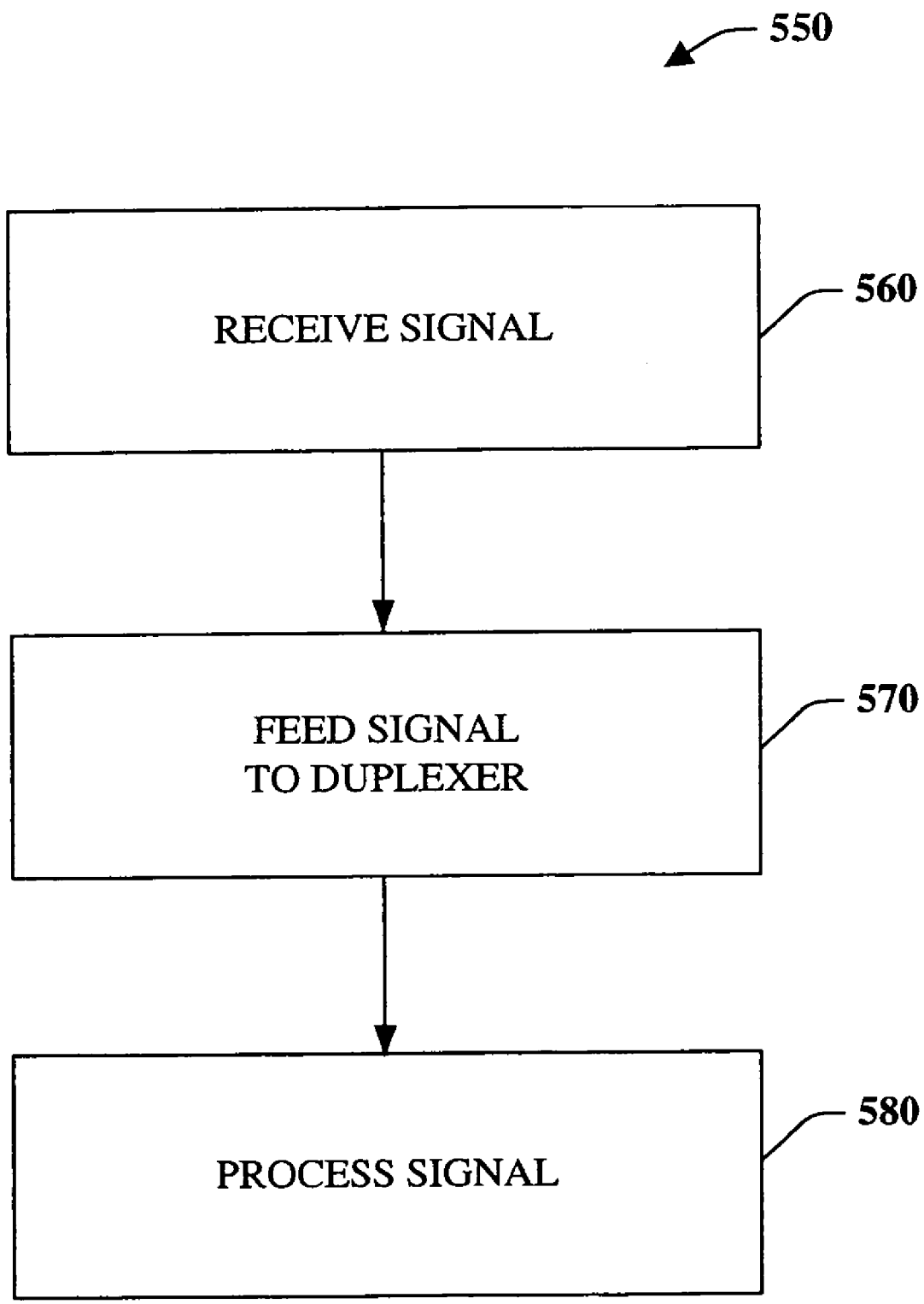
FIG. 5 illustrates a methodology to employ a balanced duplexer to receive a signal, in accordance with an aspect of the present invention.
Figure 6:
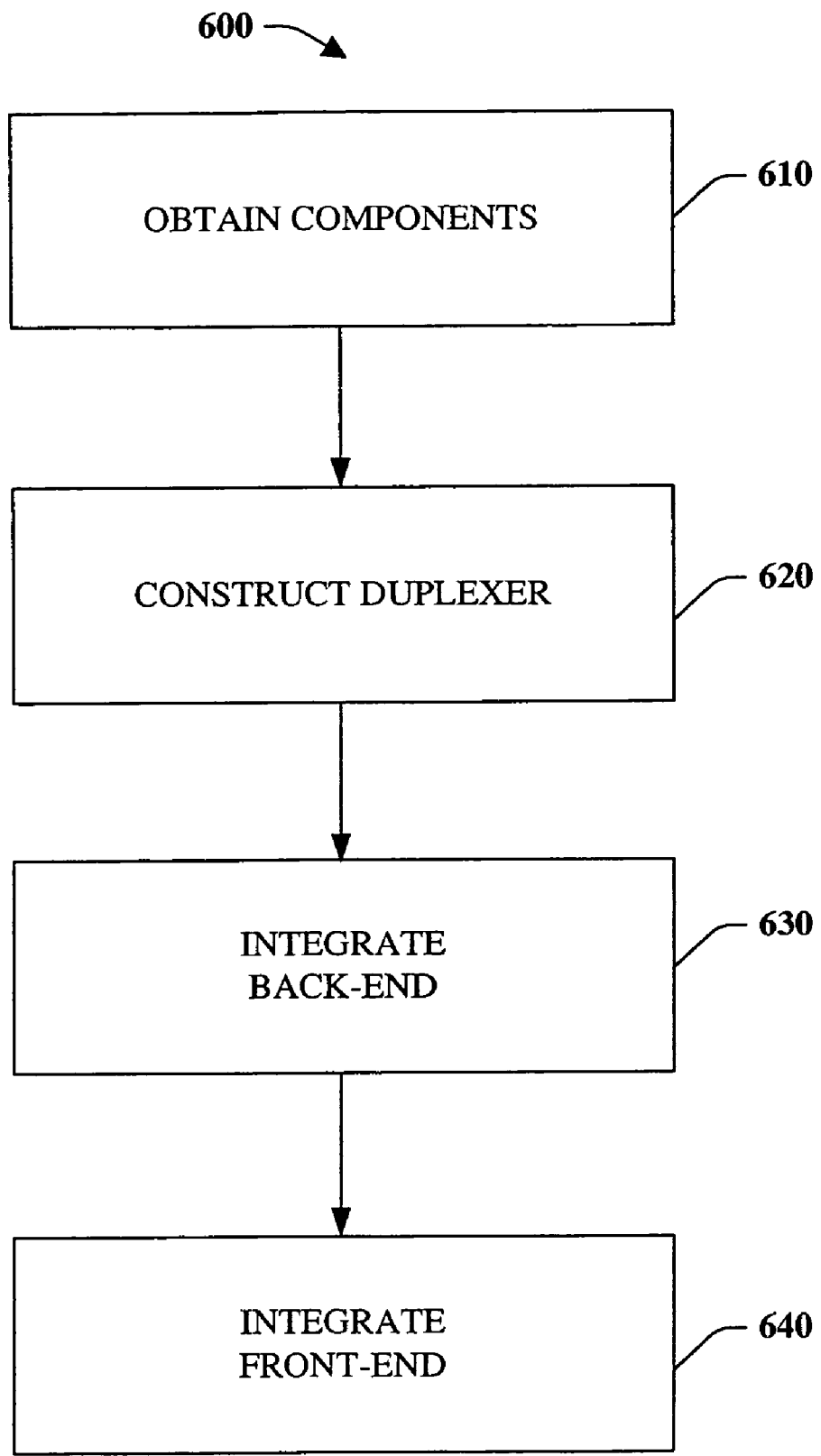
FIG. 6 illustrates a methodology to construct a balanced duplexer, in accordance with an aspect of the present invention.

FIGS. 4–6 illustrate methodologies, in accordance with an aspect the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 4 illustrates a methodology 400 that employs a balanced duplexer to transmit a signal, in accordance with an aspect of the present invention. Proceeding to reference numeral 410, a signal generator is employed to generate a signal with information that is to be transmitted. At 420, the signal can be suitably processed for transmission. For example, the signal can be amplified, phase shifted, encrypted, encoded, modulated and/or wrapped in a carrier.

At 430, the processed signal can be conveyed to a balanced duplexer. The signal can pass through a coupler (e.g., 3 dB hybrid such as a Lange) to one or more filters, wherein the signal power can be split amongst the filters (e.g., as defined via a power ratio). Splitting the power allows for utilization of lower power rated filters, which typically are smaller than higher power rated filters. For example, where two filters are employed, power can be split such that about half the power travels through respective filters. The filters typically provide a band pass frequency region via low, high and/or band pass/reject filters. Utilizing two filters additionally provides a mechanism wherein if one of the filters were to become inoperative, the other filter could be utilized to convey the full power of the signal. At 440, the signals are combined via a second coupler and conveyed to a transmitting component such as an antenna.

FIG. 5 illustrates a methodology 500 that employs a balanced duplexer to receive a signal, in accordance with an aspect of the present invention. At reference numeral 560, a signal is received. The received signal can be phase shifted, encrypted, encoded, modulated and/or wrapped in a carrier. At 570, the signal is conveyed to a balanced duplexer. It is to be appreciated that the balanced duplexer can comprise a plurality of filters and that one or more of the plurality of filters can be utilized to process the received signal. At reference numeral 480, the received signal passes through the duplexer to a signal processing stage that can be a pass through or include a means for signal amplification, conditioning, decryption, decoding, demodulation and/or carrier extraction.

Turning to FIG. 6, a methodology 600 to construct a novel balanced duplexer is illustrated. Proceeding to reference numeral 610, a PCB or substrate is procured for the duplexer. As provided above, a typical PCB comprises a non-conducting substrate with conductive patterns formed with one or more layers. The PCB can be single or double sided and/or multilayered and populated with passive and active circuitry via embedded, surface, ball and/or wire mount. Suitable components include filters, couplers, resisters, capacitors (e.g., bypass and coupling), inductors, various solid state devices including transistors and operational amplifiers, digital signal processors (DSPs), integrated circuits (ICs), multi-layered components such as ASICs with analog, digital and/or RF layers, multichip modules (MCMs), plastic encapsulated chips (PEMs) and microwave monolithic integrated circuits (MMICs). Integrated chips and derivatives thereof can be surface mounted and based on unpackaged ("bare") and/or flip chip technology. Various fastening means can be employed to couple the duplexer PCB with other components. For example, standoffs, connectors, expansion slots, mounting screws, sockets, right angle brackets, etc. can be employed. In addition, the PCB can be mounted directly to another component or to another PCB.

At reference numeral 620, the duplexer can be constructed on the PCB. In one aspect of the present invention, the duplexer is formed from two couplers (e.g., Lange) and two acoustic (e.g., SAW, FBAR and SMR) filters configured in a balanced topology (e.g., substantially similar input and output impedances). One coupler is employed at the back-end of the duplexer, wherein the coupler provides isolation between the back-end and the filters. In addition, an isolation lead from the coupler is terminated with 50Ω resistor to provide a path to divert power reflections into in order to maintain an impedance of 50Ω. The other coupler is employed at the front-end of the duplexer and provides isolation between the front-end and the filters. The filters reside between the couplers, wherein both filters are employed for signal transmission and one filter is employed for signal reception.

At reference numeral 630, a back end is interfaced to the duplexer. Since the duplexer provides isolation, an isolating component need not be employed between the back-end and the duplexer. At reference numeral 640, a front-end is interfaced to the duplexer. Likewise, since the duplexer provides isolation, an isolating component need not be employed between the front-end and the duplexer.

Figure 7:
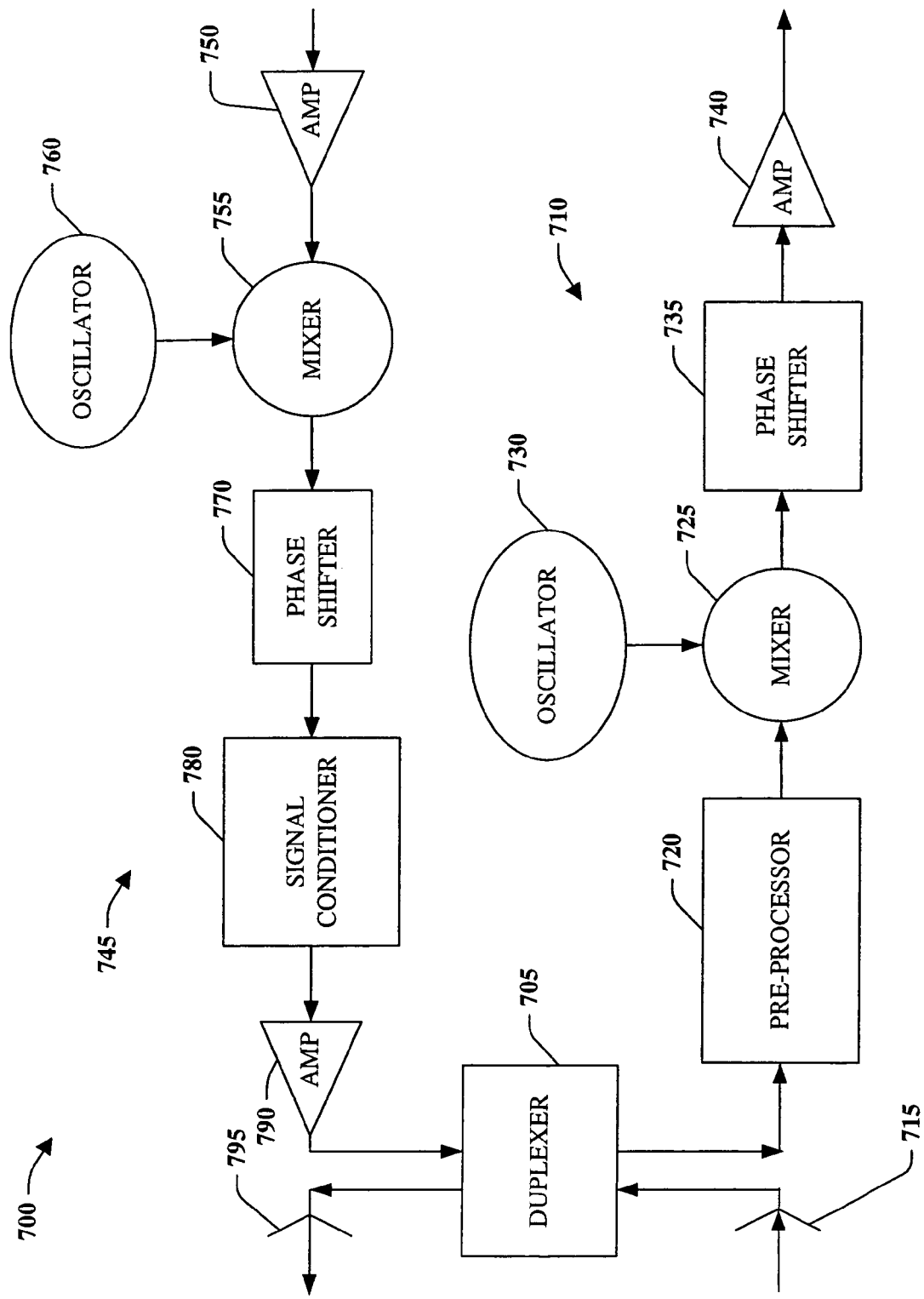
FIG. 7 illustrates exemplary front and back ends that can be employed with a balanced duplexer, in accordance with an aspect of the present invention.

FIG. 7 illustrates an exemplary transmitting and receiving system 700, in accordance with as aspect of the present invention. The system 700 comprises a duplexer 705 coupled to a receiving system 710 and a transmitting system 745. The duplexer 705 can be a balanced duplexer and/or employed in connection with a transceiving component, as described herein.

The receiving system 710 comprises a plurality of stages including pre-processing, mixing, phase shifting, and amplifying. It is to be appreciated that the stages and associated components depicted in the receiving system 710 provide for one example, and the various other configurations including additional and/or different stages and components can be employed in accordance with as aspect of the present invention. For example, the phase shifting stage can occur prior to the mixing stage.

The receiving system 710 can be employed to receive signals such as RF signals (e.g., extremely high frequency signals) and/or signals outside the RF band. The receiving component 715 can be, for example, an antenna associated with a spacecraft, a satellite, an aircraft, an automobile, a mobile device, or an amphibious vehicle. After receiving the signal, the receiving component 715 (e.g., an antenna and detector) can convey the signal to the preprocessing component 720 through the duplexer 705, as described in detail above.

The pre-processing component 720 can filter the noise in the signal. For example, RF signals typically are associated with low power levels (e.g., near the noise floor), and can be processed with a low-noise amplifier (LNA). When the gain of the LNA is sufficiently large, the noise contribution from the remaining stages of the receiving system 710 can be relatively small since the noise added via the other stages is divided by the gain of the LNA and the LNA gain and noise figure (the measure of noise added by the LNA) determine the receiver noise characteristics. The preprocessing component 720 can additionally be employed to band pass filter the signal.

After pre-processing, the signal can be conveyed to the mixer 725. In general, mixers convert an input at one frequency to an output at another frequency (e.g., an intermediate frequency (IF)) to permit filtering, phase shifting, and/or other data processing operation at a frequency more easily implemented by the circuits. The oscillator 730 can generate a local oscillator (LO) signal that can be fed into the mixer, wherein the mixer 725 can generate the output signal via combining the signal from the pre-processor 720 with the LO signal from the oscillator 730 to generate a signal at the intermediate frequency (IF) (e.g., fRF-fLO or fLO-fRF) and harmonics of the IF, RF, and LO frequencies.

For example, the receiving system 710 can be employed to acquire data within a band from 75 to 110 GHz. Filters associated with this band can have low Q or high loss, which degrades the receiver noise characteristics. Therefore, it can be advantageous to shift the received signal's frequency to a lower value where low-loss filters can be utilized. Typically, this is achieved without degrading the input signal's amplitude or introducing additional noise. The conversion efficiency of the mixer usually depends on the LO drive power.

The mixed signal can be conveyed to the phase shifter 735 for signal modulation (e.g., phase shift key modulation). In addition, the phase shifter 735 can include DC bias, RF matching and/or high Q RF short circuitry. The DC bias circuitry can be employed to vary the level of DC bias to affect the impedance state, the RF matching circuitry can be employed to pass signals within a desired frequency band, maximize power and/or block frequencies, and the high Q RF short circuitry can be employed to provide an RF short for the DC lines.

After phase shifting, the amplifier 740 can be utilized to increase the power, or gain of the signal (e.g., via transconductance or current). The number of stages in the amplifier typically is dependent on the desired gain and frequency, since transistor output power decreases with increasing frequency. The amplified signal can then be further processed and/or utilized.

Similar to the transmitting system 710, the receiving system 745 comprises a plurality of stages including amplification, mixing, phase shifting, and signal conditioning. Likewise, the various stages and associated components depicted in the receiving system 745 provide for one example, and the various other configurations including additional and/or different stages and components can be employed in accordance with as aspect of the present invention.

The transmitting system 745 comprises an amplifier 750 that amplifies signal power. The amplified signal can be conveyed to the mixer 755, wherein the mixer 755 can generate a signal at an intermediate frequency from the amplified signal and a signal from the local oscillator 760, as described above.

After generating the intermediate frequency signal, the phase shifter 770 can be employed to phase shift the signal. Various phase shifting techniques can be employed including utilizing binary, reflective, hybrid reflective and switched phase filters. The phase-shifted signal can be conditioned prior to being transmitted via the signal conditioner 780. For example, the signal can be encrypted, encoded, and/or encapsulated within an envelope. In another example, the signal can be filtered. The power amplifier 790 can be employed to increase the gain of the signal. The transmitting component 745, can convey the signal via the duplexer 705 to antenna 795 for transmission.

Figure 8:
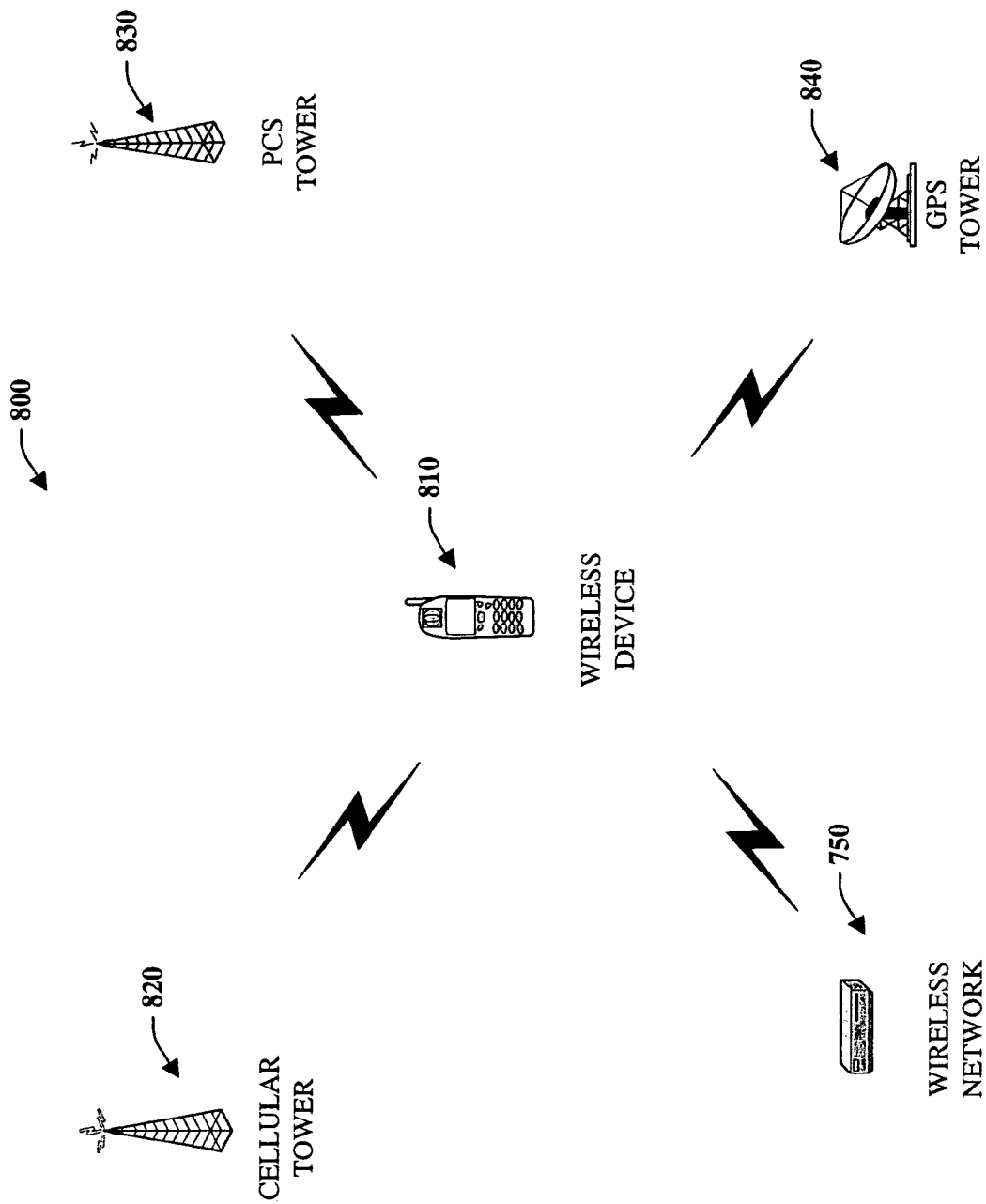
FIG. 8 illustrates an exemplary wireless communication system wherein the novel aspects of the invention can be employed.

FIG. 8 illustrates an exemplary mobile communications environment ("environment") 800, in accordance with an aspect of the present invention. The environment 800 comprises a wireless communication device ("device") 810, a cellular transceiver 820, a PCS transceiver 830, a GPS transmitter 840 and a wireless network 850 (e.g., Bluetooth and Wi-Fi).

The device 810 can include or be employed in connection with the components, systems and methods described herein. For example, the device 810 can include a transceiving component or duplexer. Furthermore, the device 810 can include a CDMA antenna, a GPS antenna and a Bluetooth antenna. In addition, enhanced and other transmission technologies (e.g., CDMA2000, WCDMA and TD-SCDMA) and other various other antenna configurations can be utilized in accordance with an aspect of the invention.

The device 810 can employ various mobile communication technologies to communicate with the cellular transceiver 820, the PCS transceiver 830, the GPS transmitter 840 and the wireless network 850. For example, the device 810 can transmit cellular information to and/or receiver cellular information from the cellular transceiver 820. Likewise, the device can transmit and/or receive information with the wireless network 850, for example with one or more devices employing Bluetooth technology or Wi-Fi/WLAN such as a PDA, a printer, a copier, a facsimile, a scanner, a display, a computer, a microprocessor and/or another mobile communication device similar to the device 810.

Figure 9:
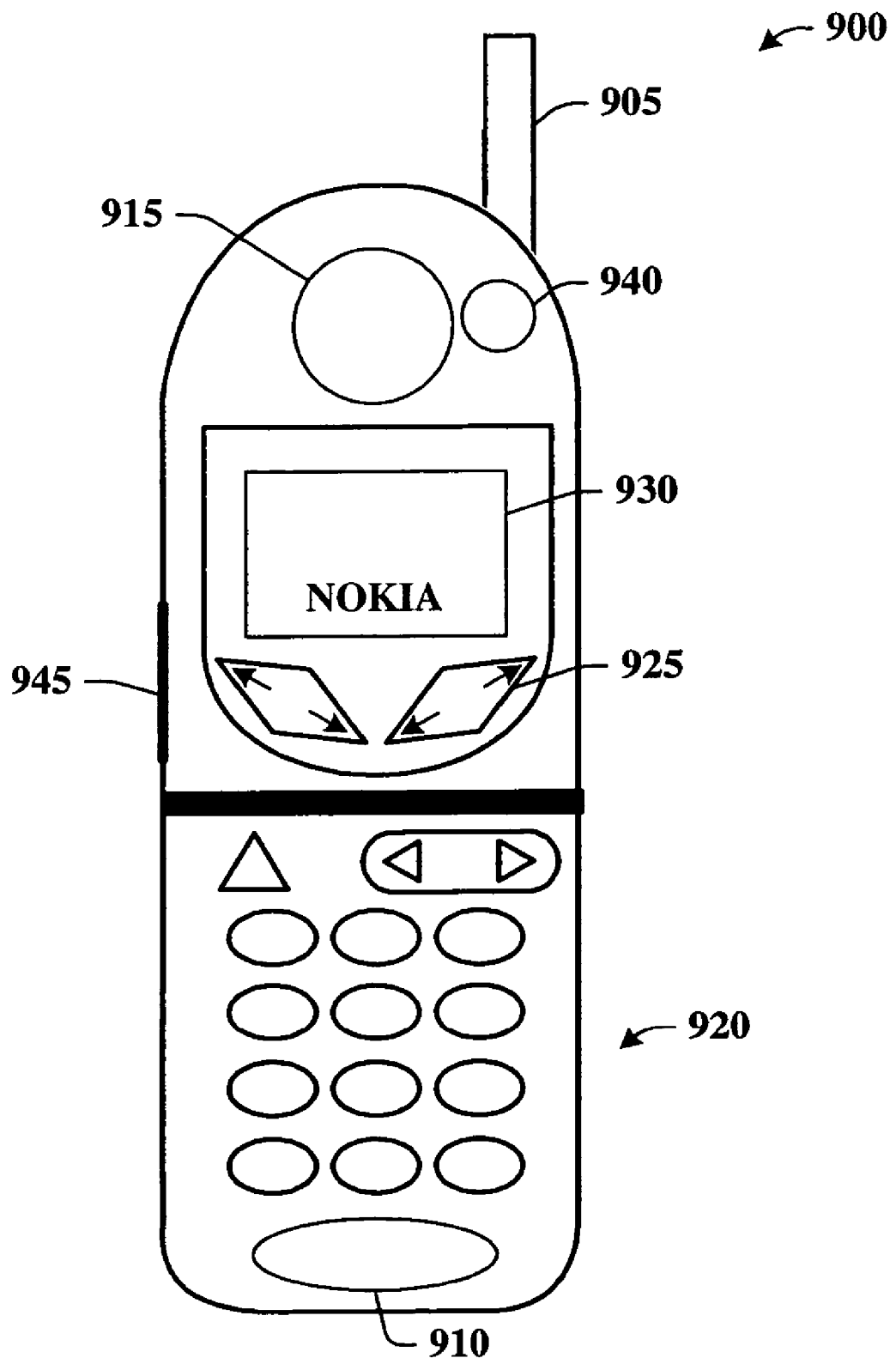
FIG. 9 illustrates an exemplary mobile device that can employ the novel aspects of the invention.

FIG. 9 illustrates an exemplary mobile (e.g., portable and wireless) telephone 900 that can employ the novel aspects of the present invention. The mobile telephone 900 comprises an antenna 905 that communicates (e.g., transmit and receive) radio frequency signals with one or more base stations. The antenna 905 can be coupled to duplexer circuitry (e.g., as described herein) within the mobile telephone 900. In addition, the mobile telephone 900 can include a separate signal-receiving component (not shown) that can also be coupled to the duplexer.

The mobile telephone 900 further comprises a microphone 910 that receives audio signals and conveys the signals to at least one on-board processor for audio signal processing, and an audio speaker 915 for outputting audio signals to a user, including processed voice signals of a caller and recipient music, alarms, and notification tones or beeps. Additionally, the mobile telephone 900 can include a power source such as a rechargeable battery (e.g., Alkaline, NiCAD, NiMH and Li-ion), which can provide power to substantially all onboard systems when the user is mobile.

The mobile telephone 900 can further include a plurality of multi-function buttons including a keypad 920, menu navigating buttons 925 and on-screen touch sensitive locations (not shown) to allow a user to provide information for dialing numbers, selecting options, navigating the Internet, enabling/disabling power, and navigating a software menue system including features in accordance with telephone configurations. A display 930 can be provided for displaying information to the user such as a dialed telephone number, caller telephone number (e.g., caller ID), notification information, web pages, electronic mail, and files such as documents, spreadsheets and videos. The display 930 can be a color or monochrome display (e.g., liquid crystal, CRT, LCD, LED and/or flat panel), and employed concurrently with audio information such as beeps, notifications and voice. Where the mobile telephone 900 is suitable for Internet communications, web page and electronic mail (e-mail) information can also be presented separately or in combination with the audio signals.

The menu navigating buttons 925 can further enable the user to interact with the display information. In support of such capabilities, the keypad 920 can provide keys that facilitate alphanumeric input, and are multifunctional such that the user can respond by inputting alphanumeric and special characters via the keypad 920 in accordance with e-mail or other forms of messaging communications. The keypad keys also allow the user to control at least other telephone features such as audio volume and display brightness.

An interface can be utilized for uploading and downloading information to memory, for example, the reacquisition time data to the telephone table memory, and other information of the telephone second memory (e.g., website information and content, caller history information, address book and telephone numbers, and music residing in the second memory). A power button 940 allows the user to turn the mobile telephone 900 power on or off.

The mobile telephone 900 can further include memory for storing information. The memory can include non-volatile memory and volatile memory, and can be permanent and/or removable. The mobile telephone 900 can further include a high-speed data interface 945 such as USB (Universal Serial Bus) and IEEE 1394 for communicating data with a computer. Such interfaces can be used for uploading and downloading information, for example website information and content, caller history information, address book and telephone numbers, and music residing in the second memory.

In addition, the mobile telephone 900 can communicate with various input/output (I/O) devices such as a keyboard, a keypad, and a mouse.

Figure 10:
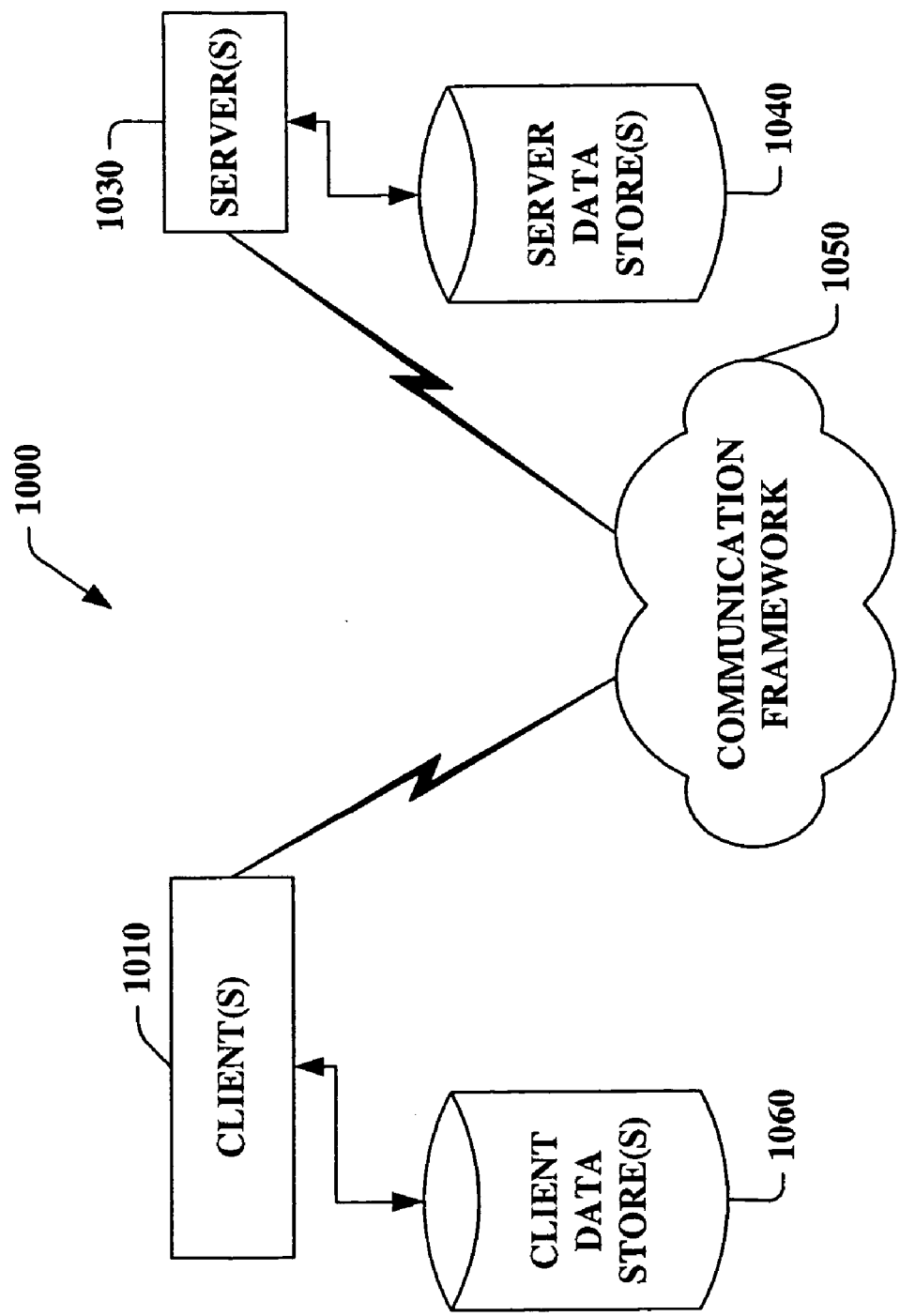
FIG. 10 illustrates an exemplary network wherein the invention can be employed.
Figure 11:
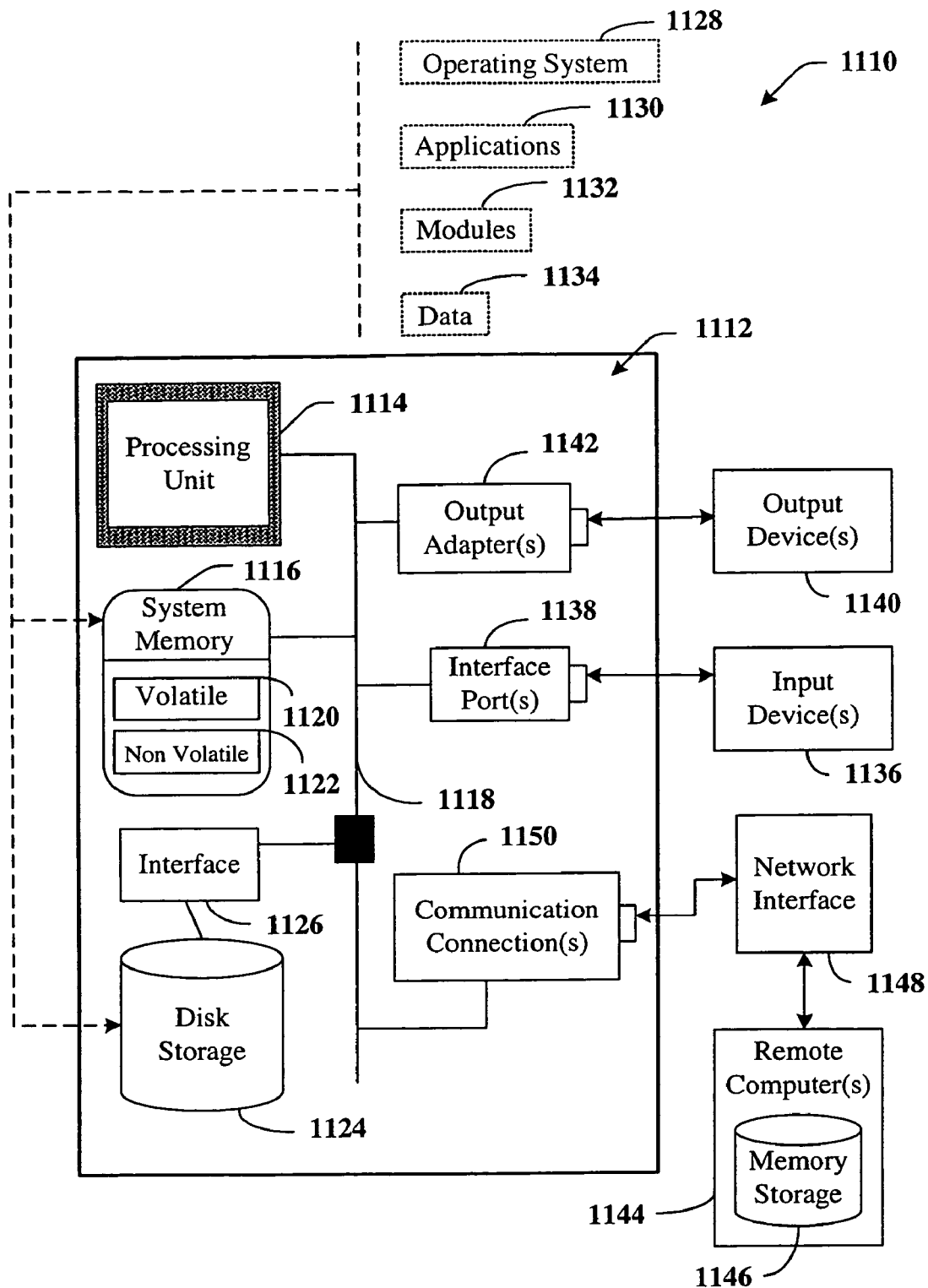
FIG. 11 illustrates an exemplary computing environment wherein the invention can be employed.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

FIG. 10 illustrates an exemplary computing environment 1000 in which the present invention can be employed. The system 1000 includes one or more client(s) 1010. The client(s) 1010 can be hardware and/or software (e.g., threads, processes, computing devices). The system 1000 additionally includes one or more server(s) 1030. Likewise, the server(s) 1030 can be hardware and/or software (e.g., threads, processes, computing devices). One possible communication between a client 1010 and a server 1030 can be in the form of a data packet transmitted between two or more computer processes. The system 1000 further includes a communication framework 1050 that can be employed to facilitate communications between the client(s) 1010 and the server(s) 1030. The client(s) 1010 can interface with one or more client data store(s) 1060, which can be employed to store information local to the client(s) 1010. Similarly, the server(s) 1000 can interface with one or more server data store(s) 1040, which can be employed to store information local to the servers 1030.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

What is claimed is:

1. A balanced duplexer, comprising:
a first filter comprising one of a bulk acoustic wave BAW filter and a surface acoustic wave SAW filter;
a second filter comprising the other one of a bulk acoustic wave BAW filter and a surface acoustic wave SAW filter, the first and second filters having a substantially similar input and output impedance;
a first coupler that interfaces the first and second filters to a processing unit of a device and the first coupler interfaces a first termination; and
a second coupler that interfaces the first and second filters to each of an antenna, a detector and a second termination, wherein the balanced duplexer is employed to facilitate transmitting and receiving signals, each signal having a respective signal power, through the first and second filters.

2. The balanced duplexer of claim 1, the first and second filters are employed such that a portion of signal power is directed through one of the filters and the remaining signal power is directed through the other filter.

3. The balanced duplexer of claim 2, the portion of signal power directed to respective filters is determined by a power ratio.

4. The balanced duplexer of claim 2, the portion of signal power directed through respective filters is about one half the total power.

5. The balanced duplexer of claim 2, the first and second filters configured such that if one filter becomes inoperable, the other filter can be utilized to process the full signal power.

6. The balanced duplexer of claim 1, the balanced duplexer buffers an input and an output stage.

7. The balanced duplexer of claim 1, the first and second couplers being 3 dB hybrid couplers comprising one of a Lange coupler and a discrete coupler.

8. The balanced duplexer of claim 7, the Lange coupler providing isolation between the first and second filters and the processing unit and the first and second filters and the antenna and the detector.

9. The balanced duplexer of claim 1, the first and second terminations is about 50Ω.

10. The balanced duplexer of claim 1 employed within at least one of a mobile phone, a web phone, a personal data assistant (PDA), a hand-held PC, a pocket PC, a palm-pilot, a laptop, a tablet PC, a Notepad, a GPS, a pager, a personal computer, a mainframe, and a workstation.

11. The balanced duplexer of claim 1, the first and second couplers divert reflected power into the first and second terminations, respectively.

12. The balanced duplexer of claim 1, the first and second couplers reduce reflected energy by combining reflected energy that is 180 degrees out of phase.

13. The balanced duplexer of claim 1, the first and second filters employed in the reception of a signal to improve LNA and antenna matching.

* * * * *